US00RE40026E

(19) United States
(12) Reissued Patent
Waldenstrom et al.

(10) Patent Number: US RE40,026 E
(45) Date of Reissued Patent: Jan. 22, 2008

(54) CEMENTED CARBIDE INSERT FOR TURNING, MILLING AND DRILLING

(75) Inventors: Mats Waldenstrom, Bromma (SE); Ake Ostlund, Hagersten (SE); Ove Alm, Hägersten (SE)

(73) Assignee: Sandvik Intellectual Property AB, Sandviken (SE)

(21) Appl. No.: 11/449,008

(22) PCT Filed: Jul. 8, 1997

(86) PCT No.: PCT/SE97/01243

§ 371 (c)(1),
(2), (4) Date: Apr. 20, 1999

(87) PCT Pub. No.: WO98/03691

PCT Pub. Date: Jan. 29, 1998

Related U.S. Patent Documents

Reissue of:
(64) Patent No.: 6,221,479
Issued: Apr. 24, 2001
Appl. No.: 09/214,923
Filed: Apr. 20, 1999

(30) Foreign Application Priority Data

Jul. 19, 1996 (SE) ..... 9602811

(51) Int. Cl.
*C04B 35/56* (2006.01)

(52) U.S. Cl. ..... 428/325; 428/323; 428/697; 428/698; 428/701; 428/702; 51/307; 51/309

(58) Field of Classification Search ..... 428/697, 428/698, 323, 325, 701, 702; 51/307, 309
See application file for complete search history.

(56) References Cited

U.S. PATENT DOCUMENTS 3,660,050 A 5/1972 Iler et al.
4,923,512 A 5/1990 Timm et al.
5,068,149 A 11/1991 Shimada et al.
5,151,247 A 9/1992 Haglund et al.

(Continued)

FOREIGN PATENT DOCUMENTS

GB 346473 1/1930

OTHER PUBLICATIONS

Dialog Information Services, File 351, Derwent WPI, Dialog Accession No. 010155859, WPI Accession No. 95–057111/199508, (NGK Spark Plug Co Ltd), "Tungsten–carbide–base cemented carbide used for cutting tool—comprises hard phase having specified particle size distribution and contg tungsten carbide and ferrous metal bonding phase", & JP,A 6335808, 19941206, 199508 B (No Date/Month).

(Continued)

*Primary Examiner*—Archene Turner
(74) *Attorney, Agent, or Firm*—Drinker Biddle & Reath LLP

(57) ABSTRACT

There is disclosed a cemented carbide insert with excellent properties for machining of steels and stainless steels. The cemented carbide comprises WC and 4–25% Co. The WC-grains have an average grain size in the range 0.2–3.5 μm and a narrow grain size distribution in the range 0–4.5 μm.

According to the method of the invention a cemented carbide cutting tool insert is made by mixing powders of WC, TiC, TaC and/or NbC, binder metal and pressing agent, drying preferably by spray drying, pressing to inserts and sintering. The method characterised in that a deagglomerated WC-powder with a narrow grain size distribution is used, that the powders of TiC, TaC and/or NbC are deagglomerated and that the mixing is wet mixing with no change in grain size or grain size distribution.

10 Claims, 1 Drawing Sheet

U.S. PATENT DOCUMENTS

| | | | |
|---|---|---|---|
| 5,288,676 | A | 2/1994 | Shimada et al. |
| 5,334,561 | A | 8/1994 | Matsui et al. |
| 5,434,112 | A | 7/1995 | Matsui et al. |
| 5,487,625 | A | 1/1996 | Ljungbert et al. |
| 5,505,902 | A | 4/1996 | Fischer et al. |
| 5,529,804 | A | 6/1996 | Bonneau et al. |
| 5,674,564 | A | 10/1997 | Ljungberg et al. |
| 5,786,069 | A | 7/1998 | Ljungberg et al. |
| 5,841,045 | A | 11/1998 | McCandlish et al. |

OTHER PUBLICATIONS

Dialog Information Services, File 351, Derwent WPI, Dialog Accession No. 011397725, WPI Accession No. 97–375632/199735, (Kobe Steel Ltd), "Hard tough cemented carbide—comprises mainly tungsten carbide, cobalt and nickel", & JP,A,9125185, 19970513, 199735 B (No Date/Month).

Dialog Information Services, File 351, Derwent WPI, Dialog Accession No. 011172064, WPI Accession No. 97–149989/199714, (Dijet Ind Co Ltd), "Sintered hard material for water jet or wire drawing die nozzles—comprises iron, cobalt, and/or nickel, carbide and/or carbonitride of Gp–IVA transition metal, and tungsten carbide", & JP,A9025535, 19979128, 199174 B (No Date/Month).

Dialog Information Services, File 351, Derwent WPI, Dialog Accession No. 008723156, WPI Accession No. 91–227173/199131, (Toshiba Tungalloy KK), "Coated sintered hard alloy for intermittent cuttin—base has single or multilayers of ceramics on matrix of tungsten carbide or gp–IVA, gp–VA or gp–VIA carbide(s) or carbonitride(s)", & JP,A,3146677, 19910621, 199131 B (No Date/Month).

Dialog Information Services, File 351, Derwent WPI, Dialog Accession No. 008551086, WPI Accession No. 91–055137/199108, (Hitachi Tool KK) , "Super–hard alloy prodn.—comprises hard phase of titanium–carbide, titanium–nitride and tungsten carbide and binder phase of Iron–Gp. metal", JP,A,3006349, 19910111, 199108 B (No Date/Month).

Dialog Information Services, File 351, Derwent WPI, Dialog Accession No. 004689404, WPI Accession No. 86–192746/198630 (Hitachi Choko KK), "Utrafine particles sintered hard alloy–13 comprises tungsten carbide hard phase bonded with iron and chromium gp elements contg. carbide(s)", JP,A,61124548, 19860612, 198630 B (No Date/Month).

Dialog Information Services, File 351, Derwent WPI, Dialog Accession No. 004675229, WPI Accession No. 86–178571/198628, (Hitachi Choko KK et al.), "Hard alloy useful for cutting tools etc.—comprises hard phase contg. tungsten carbide, and binder metal phase contg. Iron–gp and chromium–gp. elements", JP,A,61110745, 19860529, 198628 B (No Date/Month).

CEMENTED CARBIDE INSERT FOR TURNING, MILLING AND DRILLING

Matter enclosed in heavy brackets [ ] appears in the original patent but forms no part of this reissue specification; matter printed in italics indicates the additions made by reissue.

*CROSS-REFERENCES TO RELATED APPLICATIONS*

*The present application is a reissue of U.S. Pat. No. 6,221,479 B1, which is a national stage filing under §371 of PCT/SE97/01243 filed Jul. 8, 1997, which claims the benefit of priority to Swedish Application No. 9602811-3 filed Jul. 19, 1996.*

BACKGROUND OF THE INVENTION

The present invention relates to a cemented carbide cutting tool insert, particularly useful for turning, milling and drilling of steels and stainless steels.

Conventional cemented carbide inserts are produced by powder metallurgical methods including milling of a powder mixture forming the hard constituents and the binder phase, pressing and sintering. The milling operation is an intensive milling and mills of different sizes and with the aid of milling bodies. The milling time is of the order of several hours up to several days. Such processing is believed to be necessary in order to obtain a uniform distribution of the binder phase in the milled mixture. It is further believed that the intensive milling creates a reactivity of the mixture which further promotes the formation of a dense structure. However, milling has its disadvantages. During the long milling time, the milling bodies are worn and contaminate the milled mixture. Furthermore even after an extended milling, a random rather than an ideal homogeneous mixture may be obtained. Thus, the properties of the sintered cemented carbide containing two or more components depend on how the starting materials are mixed.

There exist alternative technologies to intensive milling for production of cemented carbide, for example, use of particles coated with binder phase metal. The coating methods include fluidized bed methods, solgel techniques, electrolytic coating, PVD coating or other methods such as disclosed in, e. g., GB 346,473, U.S. Pat. No. 5,529,804 or U.S. Pat. No. 5,505,902. Coated carbide particles could be mixed with additional amounts of cobalt and other carbide powders to obtain the desired final material composition, pressed and sintered to a dense structure.

During metal cutting operations like turning, milling and drilling, the general properties such as hardness, resistance against plastic deformation, resistance against formation of thermal fatigue cracks are to a great extent related to the volume fraction of the hard phases and the binder phase in the sintered cemented carbide body. It is well known that increasing the amount of the binder phase reduces the resistance to plastic deformation. Different cutting conditions require different properties of the cutting insert. When cutting of steels with raw surface zones (e.g. rolled, forged or cast, a coated cemented carbide insert must consist of tough cemented carbide and have a very good coating adhesion as well. When turning, milling or drilling in low alloyed steels, or stainless steels the adhesive wear is generally the dominating wear type.

Measures can be taken to improve the cutting performance with respect to a specific wear type. However, very often such action will have an negative effect on other wear properties.

The influence of some possible measures is given below:

1. Milling, turning or drilling at high cutting speeds and high cutting edge temperature require a cemented carbide with a rather large amount of cubic carbides (a solid solution of WC-TiC-TaC-NbC). Thermal fatigue cracks will often more easily develop in such carbides.

2. The formation of thermal fatigue cracks can be reduced by lowering the binder phase content. However, such action will lower the toughness properties of the cutting insert which is not desirable.

3. Improved abrasive wear can be obtained by increasing the coating thickness. However, thick coatings increase the risk for flaking and will lower the resistance to adhesive wear.

OBJECTS AND SUMMARY OF THE INVENTION

It is an aspect of this invention to provide a method of making a cemented carbide insert provided with a thin wear resistant coating with excellent properties for machining of steels and stainless steels comprising WC, 5–12.5 wt-% Co and 0–10 wt-% cubic carbides such as TiC, TaC, NbC or mixtures thereof wherein the WC-grains have an average grain size in the range of 1.0–3.0 μm, the WC grains have a narrow grain size distribution in the range 0.5–4.5 μm, the W-content in the binder phase expressed as the "CW-ratio" defined as [CW-ratio=$M_s$/wt % Co*0.0161]

$$CW\text{-}ratio = \frac{M_s}{(wt.\ \%\ Co \times 0.0161)},$$

where $M_s$ is the measured saturation magnetization of the sintered cemented carbide insert in [kA/m] $hAm^2/kg$ and wt % Co is the weight percentage of Co in the cemented carbide, is 0.86–0.96.

It has now surprisingly been found that cemented carbide inserts made from powder mixtures with hard constituents with narrow grain size distributions and without conventional milling have excellent cutting performance in steels and stainless steels with or without raw surfaces in turning, milling and drilling under both dry and wet conditions.

DETAILED DESCRIPTION OF THE PREFERRED EMBODIMENTS OF THE INVENTION

Figure 1:
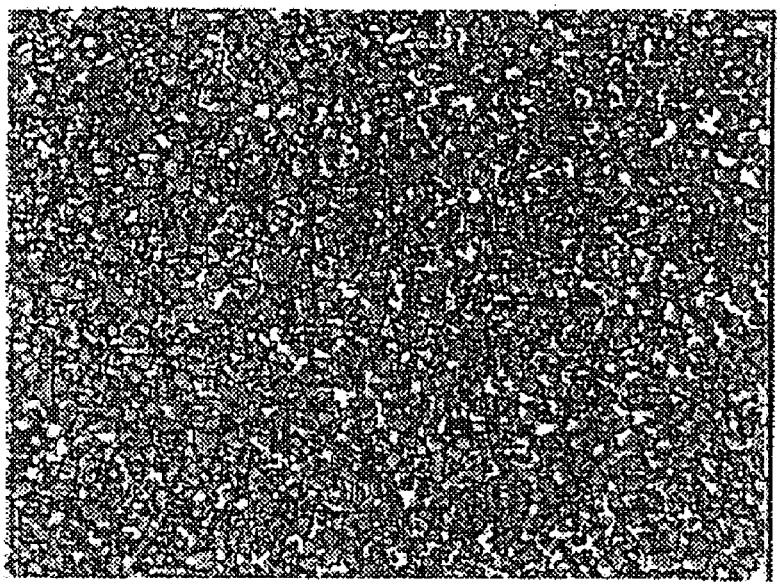
FIG. 1 shows in 1200X the microstructure of a cemented carbide insert according to the invention.

According to the invention, there is now provided cemented carbide inserts with excellent properties for machining of steels and stainless steels comprising WC and 4–20 wt-% Co, preferably 5–12.5 wt-% Co and 0–30 wt-% cubic carbide, preferably 0–15 wt-% cubic carbide, most preferably 0–10 wt-% cubic carbide such as TiC, TaC, NbC or mixtures thereof. The WC-grains have an average grain size in the range 0.8–3.5 μm, preferably 1.0–3.0 μm. The microstructure of the cemented carbide according to the invention is further characterized by a narrow grain size distribution of WC in the range 0.5–4.5 μm, and a lower tendency for the cubic carbide particles, when present, to form long range skeleton, compared to conventional cemented carbide.

In another alternative embodiment, there is provided cemented carbide inserts comprising WC and 10–25 wt-% Co, preferably 15–20 wt-% Co, and <2 wt-%, preferably <1 wt-% cubic carbides such as $Cr_3C_2$ and/or VC added as grain growth inhibitors. The WC-grains have an average grain size 0.2–1.0 μm. The microstructure of cemented carbide according to the invention is further characterized by a narrow grain size distribution of WC in the range 0–1.5 μm.

The amount of W dissolved in binder phase is controlled by adjustment of the carbon content by small additions of carbon black or pure tungsten powder. The W-content in the binder phase can be expressed as the "CW-ratio" defined as $$\text{CW-ratio}=M_S/(\text{wt\%Co}*0.0161)$$

where $M_s$ is the measured saturation magnetization of the sintered cemented carbide body in [kA/m] $hAm^2/kg$ and wt % Co is the weight percentage of Co in the cemented carbide. The CW-ratio in inserts according to the invention shall be 0.82–1.0, preferably 0.86–0.96.

The sintered inserts according to the invention are used coated or uncoated, preferably coated with MTCVD, conventional CVD or PVD with or without $Al_2O_3$. In particular, multilayer coatings comprising $TiC_xN_yO_z$ with columnar grains followed by a layer of $\alpha$-$Al_2O_3$, $\kappa$-$Al_2O_3$ or a mixture of $\alpha$- and $\kappa$-$Al_2O_3$, have shown good results. In another preferred embodiment, the coating described above is completed with a TiN-layer which could be brushed or used without brushing.

According to the method of the present invention, WC-powder with a narrow grain size distribution is wet mixed without milling with deagglomerated powder of other carbides generally TiC, TaC and/or NbC, binder metal and pressing agent, dried preferably by spray drying, pressed to inserts and sintered.

WC-powder with a narrow grain size distributions according to the invention with eliminated coarse grain tails >4.5 μm and with eliminated fine grain tails, <0.5 μm, are prepared by sieving such as in a jetmill-classifier. It is essential according to the invention that the mixing takes place without milling, i.e., there should be not change in grain size or grain size distribution as a result of the mixing.

Hard constituents with narrow grain size distribution according to the alternative embodiment with eliminated coarse grain tails >1.5 μm are prepared by sieving such as in a jetmill classifier. It is essential according to the invention that the mixing takes place without milling i.e. there should be no change in grain size or grain size distribution as a result of the mixing.

In a preferred embodiment, the hard constituents, at least those with narrow grain size distribution, are after careful deagglomeration coated with binder metal using methods disclosed in U.S. Pat. No. 5,505,902 or U.S. Pat. No. 5,529,804. In such case, the cemented carbide powder according to the invention consists preferably of Co-coated WC+Co-binder, with or without additions of the cubic carbides, TiC, TaC, NbC, (Ti, W)C, (Ta,Nb)C, (Ti,Ta,Nb)C, (W,Ta,Nb)C, (W,Ti,Ta,Nb)C or $Cr_3C_2$ and/or VC coated or uncoated, preferably uncoated, possibly with further additions of Co-powder in order to obtain the desired final composition.

The invention is additionally illustrated in connection with the following Examples which are to be considered as illustrative of the present invention. It should be understood, however, that the invention is not limited to the specific details of the Examples.

EXAMPLE 1

A. Cemented carbide tool inserts of the type SEMN 1204 AZ, an insert for milling, with the composition 9.1 wt % Co, 1.23 wt % TaC and 0.30 wt % NbC and rest WC with a grain size of 1.6 μm were produced according to the invention. Cobalt coated WC, WC-2 wt % Co, prepared according to U.S. Pat. No. 5,505,902 was carefully deagglomerated in a laboratory jetmill equipment, mixed with additional amounts of Co and deagglomerated uncoated (Ta,Nb)C and TaC powders to obtain the desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with carbon black to a binder phase highly alloyed with W corresponding to a CW-ratio of 0.89. After spray drying, the inserts were pressed and sintered according to standard practise and dense structures with no porosity were obtained, FIG. 1.

Before coating, a negative chamfer with an angle of 20° was ground around the whole insert.

The inserts were coated with a 0.5 μm equiaxed TiCN-layer (with a high nitrogen content corresponding to an estimated C/N-ratio of 0.05) followed by a 4 μm thick TiCN-layer with columnar grains by using MTCVD-technique (temperature 885–850° C. and $CH_3CN$ as the carbon and nitrogen source). In subsequent steps during the same coating cycle, a 1.0 μm thick layer of $Al_2O_3$ was deposited using a temperature 970° C. and a concentration of $H_2S$ dopant of 0.4% as disclosed in EP-A-523 021. A thin (0.3 μm) layer of TiN was deposited on top according to known CVD-technique. XRD-measurement showed that the $Al_2O_3$-layer consisted of 100% $\kappa$-phase.

The coated inserts were brushed by a nylon straw brush containing SiC grains. Examination of the brushed inserts in a light microscope showed that the thin TiN-layer had been brushed away only along the cutting edge leaving there a smooth $Al_2O_3$-layer surface.

Coating thickness measurements on cross sectioned brushed samples showed no reduction of the coating along the edge line except for the outer TiN-layer that was removed.

Figure 2:
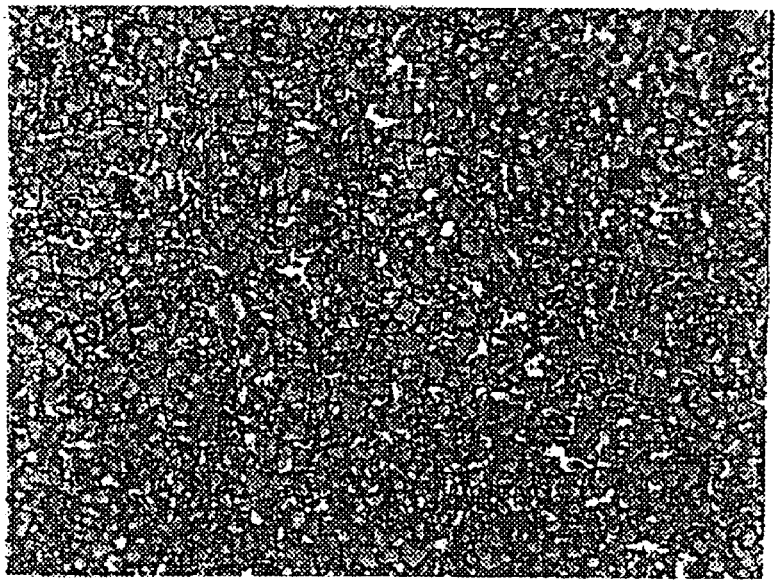
FIG. 2 shows in 1200X the microstructure of a corresponding insert made according to prior art.

B. Cemented carbide tool inserts of the type SEMN 1204 AZ with the same chemical composition, average grain size of WC, CW-ratio, chamfering and CVD-coating respectively but produced from powder manufactured with conventional ball milling techniques, FIG. 2, were used as reference.

Inserts from A were compared to inserts from B in a wet milling test in a medium alloyed steel (HB=210) with hot rolled and rusty surfaces. Two parallel bars each of a thickness of 33 mm were centrally positioned relative to the cutter body (diameter 100 mm) and with an air gap of 10 mm between them.

The cutting data were:

Speed=160 m/min

Feed=0.20 mm/rev

Cutting depth=2 mm, single tooth milling with coolant.

Evaluated life length of variant A according to the invention was 3600 mm and for the standard variant B only 2400 mm. Since the CW-ratio, the negative chamfer and the coatings were equal for variants A and B, the differences in cutting performance depend on the improved properties obtained by the invention.

EXAMPLE 2

A. Cemented carbide tool inserts of the type SEMN 1204 AZ according to the invention identical to the test specimen (A) in Example 1.

B. Cemented carbide tool inserts of the type SEMN 1204 AZ identical to the reference specimen (B) in Example 1.

C. A strongly competitive cemented carbide grade of the type SEKN 1204 from an external leading carbide producer with the composition 7.5 wt-% Co, 0.4 wt-% TaC, 0.1 wt % NbC, 0.3 wt % TiC rest WC and a CW-ratio of 0.95. The insert was provided with a coating consisting of a 0.5 μm equiaxed TiCN-layer, 2.1 μm columnar TiCN-layer, 2.2 μm κ-$Al_2O_3$-layer and a 0.3 μm TiN-layer.

Inserts from A were compared against inserts from B and C in a dry milling test in a low alloyed steel (HB=300) with premachined surfaces. A bar with a thickness of 180 mm was centrally positioned relative to the cutter body (diameter 250 mm)

The cutting data were:

Speed=150 m/min,

Feed=0.23 mm/rev

Cutting depth=2 mm, single tooth milling dry conditions.

Insert B broke after 6000 mm after comb crack formation and chipping and insert C broke after 4800 mm by a similar wear pattern. Finally, insert A according to the invention, broke after 8000 mm.

EXAMPLE 3

A. Cemented carbide tool inserts of the type CNMG 120408-QM, an insert for turning, with the composition 8.0 wt % Co, and rest WC with a grain size of 3.0 μm were produced according to the invention. Cobalt coated WC, WC-8 wt % Co, prepared according to U.S. Pat. No. 5,505,902 was carefully deagglomerated in a laboratory jetmill equipment. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with carbon black to a binder phase alloyed with w corresponding to a CW-ratio of 0.93. After spray drying, the inserts were pressed and sintered according to standard practise and dense structures with no porosity were obtained.

The inserts were coated with conventional CVD TiN+TiCN,1+1 μm.

B. Cemented carbide tool inserts of the type CNMG 120408-QM with the same chemical composition, average grain size of WC, CW-ratio and the same CVD-coating respectively but produced from powder manufactured with conventional ball milling techniques were used as reference.

Inserts from A and B were compared in a face turning test where the resistance against plastic deformation was measured as the flank wear. The work piece material was a rather highly alloyed steel, a bar with diameter 180 mm (HB=310).

The cutting data were:

Speed=290 m/min

Feed=0.30 mm/rev

Depth of cut=2 mm

The flank wear after two passages (average for three edges per variant) was found to be 0.27 mm for variant A according to the invention and 0.30 for variant B.

EXAMPLE 4

A. Cemented carbide inserts of the type CNMG120408-MM, an inserted for turning, with the composition 10.5 wt-% Co, 1.16 wt-% Ta, 0.28 wt-% Nb and rest WC with a grain size of 1.6 μm were produced according to the invention. Cobalt coated WC, WC-6 wt % Co, prepared according to U.S. Pat. No. 5,505,902 was carefully deagglomerated in a laboratory jetmill equipment, mixed with additional amounts of Co and deagglomerated uncoated (Ta,Nb)C and TaC powders to obtain desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with carbon black to a binder phase highly alloyed with W corresponding to a CW-ratio of 0.87. After spray drying, the inserts were pressed and sintered according to standard practise and dense structures with no porosity were obtained.

The inserts were coated with an innermost 0.5 μm equiaxed TiCN-layer with a high nitrogen content, corresponding to an estimated C/N ratio of 0.05, followed by a 4.2 μm thick layer of columnar TiCN deposited using MT-CVD technique. In subsequent steps during the same coating process a 1.0 μm layer of $Al_2O_3$ consisting of pure α-phase according to procedure disclosed in EP-A-523 021. A thin, 0.5 μm, TiN layer was deposited, during the same cycle, on top of the $Al_2O_3$-layer.

The coated insert was brushed by a SiC containing nylon straw brush after coating, removing the outer TiN layer on the edge.

B. Cemented carbide tool inserts of the type CNMG120408-MM with the same chemical composition, average grain size of WC, CW-ratio and the same CVD-coating respectively but produced from powder manufactured with conventional ball milling techniques were used as reference.

Inserts from A and B were compared in facing of a bar, diameter 180, with two, opposite, flat sides (thickness 120 mm) in 4LR60 material (a stainless steel).

The cutting data were:

Feed=0.25 mm/rev,

Speed=180 m/min and

Depth of cut=2 mm.

The wear mechanism in this test was chipping of the edge.

Result

Insert Number of cuts

A, according to the invention 19

B 15

EXAMPLE 5

A. Cemented carbide turning tool inserts of the type CNMG120408-PM with the composition 5.48 wt-% Co, 3.30 wt-% Ta, 2.06 wt-% Nb, 2.04 wt % Ti and rest WC with a grain size of 1.6 μm were produced according to the invention. Cobalt coated WC, WC-5 wt % Co, prepared according to U.S. Pat. No. 5,505,902 was carefully deagglomerated in a laboratory jetmill equipment, mixed with additional amounts of Co and deagglomerated uncoated (Ta,Nb)C, TaC and (Ti,W)C powders to obtain desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with tungsten powder to a binder phase alloyed with W corresponding to a CW-ratio of 0.95. After spray drying, the inserts were pressed and sintered according to standard practise and dense structures with no porosity were obtained.

The inserts were coated with an innermost 5 μm layer of TiCN, followed by in subsequent steps during the same coating process a 6 μm layer of $Al_2O_3$.

B. Cemented carbide turning tool inserts of the type CNMG120408-PM with the composition 5.48 wt-% Co, 3.30 wt-% Ta, 2.06 wt-% Nb, 2.04 wt % Ti and rest WC with a grain size of 1.6 μm were produced according to the invention. Uncoated deagglomerated WC was mixed with additional amounts of Co and deagglomerated uncoated (Ta,Nb)C, TaC and (Ti,W)C powders to obtain a desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with tungsten powder to a binder phase alloyed with W corresponding to a CW-ratio of 0.95. After spray drying, the inserts were pressed and sintered according to standard practise and dense structures with no porosity were obtained.

The inserts were coated with an innermost 5 μm layer of TiCN, followed by in subsequent steps during the same coating process a 6 μm layer of $Al_2O_3$.

C. Cemented carbide turning tool inserts of the type CNMG120408-PM with the composition 5.48 wt-% Co, 3.30 wt-% Ta, 2.06 wt-% Nb, 2.04 wt % Ti and rest WC produced from powder manufactured with conventional ball milling techniques with the same CW-ratio and almost the same average WC-grain size as insert A and B were coated with the same coating as insert A and B.

Inserts from A, B and C were compared in an external longitudinal turning test with cutting speed 220 m/min and 190 m/min resp., a depth of cut of 2 mm, and a feed per tooth equal to 0.7 mm/revolution. The work piece material was SS 2541 with a hardness of 300 HB and a diameter of 160 mm. The wear criteria in this test was the measure of the edge depression in μm, which reflects the inverse resistance against plastic deformation. A lower value of the edge depression indicates higher resistance against plastic deformation.

The following results were obtained:

| | v = 190 m/min edge depression, μm | v = 220 m/min edge depression, μm |
|---|---|---|
| A | 59 | 85 |
| B | 56 | 93 |
| C | 89 | 116 |

Since the general toughness behavior was similar it is clear that both insert A produced from Co-coated WC and insert B produced from uncoated WC both according to the invention, performed better than insert C produced with conventional techniques.

EXAMPLE 6

A. Cemented carbide turning tool inserts of the type CNMG120408-PM with the composition 5.48 wt-% Co, 3.30 wt-% Ta, 2.06 wt-% Nb, 2.04 wt % Ti and rest WC with a grain size of 1.6 μm were produced according to the invention. Cobalt coated WC, WC-5 wt % Co, prepared according to U.S. Pat. No. 5,505,902 was carefully deagglomerated in a laboratory jetmill equipment, mixed with additional amounts of Co and deagglomerated uncoated (Ta,Nb)C, TaC and (Ti,W)C powders to obtain desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with tungsten powder to a binder phase alloyed with w corresponding to a CW-ratio of 0.95. After spray drying, the inserts were pressed and sintered according to standard practise and dense structures with no porosity were obtained.

The inserts were coated with an innermost 5 μm layer of TiCN, followed by in subsequent steps during the same coating process a 6 μm layer of $Al_2O_3$.

B. Cemented carbide turning tool inserts of the type CNMG120408-PM with the composition 5.48 wt-% Co, 3.30 wt-% Ta, 2.06 wt-% Nb, 2.04 wt % Ti and rest WC with a grain size of 1.6 μm were produced according to the invention. Uncoated deagglomerated WC was mixed with additional amounts of Co and deagglomerated uncoated (Ta,Nb)C, TaC and (Ti,W)C powders to obtain desired material composition. The mixing was carried out in an ethanol and water solution (0.25 l fluid per kg cemented carbide powder) for 2 hours in a laboratory mixer and the batch size was 10 kg. Furthermore, 2 wt % lubricant, was added to the slurry. The carbon content was adjusted with tungsten powder to a binder phase alloyed with W corresponding to a CW-ratio of 0.95. After spray drying, the inserts were pressed and sintered according to standard practise and dense structures with no porosity were obtained.

The inserts were coated with an innermost 5 μm layer of TiCN, followed by in subsequent steps during the same coating process a 6 μm layer of $Al_2O_3$.

C. Cemented carbide turning tool inserts of the type CNMG120408-PM with the composition 5.48 wt-% Co, 3.30 wt-% Ta, 2.06 wt-% Nb, 2.04 wt % Ti and rest WC produced from powder manufactured with conventional ball milling techniques with the same CW-ratio and almost the same average WC-grain size as insert A and B were coated with the same coating as insert A and B.

Inserts from A, B and C were compared in a external longitudinal turning test with cutting data 240 m/min, a dept of cut of 2 mm, and a feed per tooth equal to 0.7 mm/revolution. The work piece material was SS 2541 with a hardness of 300 HB and a diameter of 160 mm. The wear criteria in this test was the measure of the maximum flank wear after 5 min in cutting time, which reflects the resistance against plastic deformation.

The following results were obtained:

| | max. flank wear, μm |
|---|---|
| A | 28 |
| B | 35 |
| C | 38 |

Since the general toughness behavior was similar it is clear that both insert A produced from Co-coated WC, and insert B produced from uncoated WC both according to the invention, performed better than insert C produced with conventional techniques.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A cemented carbide insert provided with a thin wear resistant coating with excellent properties for machining of steels and stainless steels comprising WC, 5–12.5 wt-% Co and 0–10 wt-% cubic carbides such as TiC, TaC, NbC or mixtures thereof wherein the WC-grains have an average grain size in the range 1.0–3.0 μm the WC grains have a narrow grain size distribution in the range 0.5–4.5 μm the W-content in the binder phase expressed as the "CW-ratio" defined as

[CW-ratio=$M_s$/wt%Co*0.0161]

$$CW\text{-}ratio = \frac{M_s}{(wt.\ \%\ Co \times 0.0161)}$$

where $M_s$ is the measured saturation magnetization of the sintered cemented carbide insert in [kA/m] $hAm^2/kg$ and wt % Co is the weight percentage of Co in the cemented carbide, is 0.86–0.96.

2. The cemented carbide insert of claim 1 wherein said coating comprises $TiC_xN_xO_z$ with columnar grains followed by a layer of α-$Al_2O_3$, κ-$Al_2O_3$ or a mixture of α-and κ-$Al_2O_3$.

*3. The cemented carbide insert of claim 2 wherein said coating includes an outer TiN-layer.*

*4. The cemented carbide insert of claim 3 wherein said TiN-layer is brushed.*

*5. The cemented carbide insert of claim 2 wherein said layer is of α-$Al_2O_3$.*

*6. The cemented carbide insert of claim 2 wherein said layer is of κ-$Al_2O_3$.*

*7. The cemented carbide insert of claim 2 wherein said layer is of a mixture of α-$Al_2O_3$ and κ-$Al_2O_3$.*

*8. The cemented carbide insert of claim 2 wherein said layer is of κ-$Al_2O_3$ and said coating includes an outer TiN-layer.*

*9. The cemented carbide insert of claim 2 wherein said layer is of α-$Al_2O_3$ and said coating includes an outer TiN-layer.*

*10. The cemented carbide insert of claim 2 wherein said layer is of a mixture of α-$Al_2O_3$ and κ-$Al_2O_3$ and said coating includes an outer TiN-layer.*

* * * * *